United States Patent [19]
Nonaka

[11] Patent Number: 5,493,362
[45] Date of Patent: Feb. 20, 1996

[54] DISTANCE MEASURING DEVICE FOR HIGH-PRECISELY MEASURING GREAT LONG DISTANCE RANGE FOR AUTO FOCUSING IN CAMERA

[75] Inventor: Osamu Nonaka, Sagamihara, Japan

[73] Assignee: Olympus Optical Co., Ltd., Tokyo, Japan

[21] Appl. No.: 342,720

[22] Filed: Nov. 21, 1994

[30] Foreign Application Priority Data

Nov. 24, 1993 [JP] Japan .................................. 5-293243

[51] Int. Cl.$^6$ .............................. G03B 13/36; G01C 3/08
[52] U.S. Cl. ........................................ 354/403; 356/3.04
[58] Field of Search .................................. 354/403, 412; 356/3.03, 3.04

[56] References Cited

U.S. PATENT DOCUMENTS

| | | | |
|---|---|---|---|
| 4,423,934 | 1/1984 | Lambeth et al. ........................ | 354/412 |
| 4,939,533 | 7/1990 | Okada et al. ........................ | 354/403 X |
| 5,185,517 | 2/1993 | Inamori et al. ....................... | 354/403 X |
| 5,257,060 | 10/1993 | Kotani et al. ........................ | 354/403 X |
| 5,337,116 | 8/1994 | Nonaka et al. ........................ | 354/403 |

FOREIGN PATENT DOCUMENTS 50-23247  3/1975  Japan .
1-291111  11/1989  Japan .

*Primary Examiner*—W. B. Perkey
*Attorney, Agent, or Firm*—Frishauf, Holtz, Goodman, Langer & Chick

[57] ABSTRACT

A light-emitting section projects distance measurement light to an object to be photographed. A light-receiving section receives a reflected light beam from the object, and outputs a pair of current signals corresponding to an incident position of the reflected light beam, and a light amount signal corresponding to an amount of received light beam. A storage section stores a correction value associated with a noise component (superposed on outputs from the light-receiving section) which does not depend on a distance to the object. A calculating section calculates the distance to the object on the basis of the pair of current signals using the light amount signal output and the correction value.

16 Claims, 10 Drawing Sheets

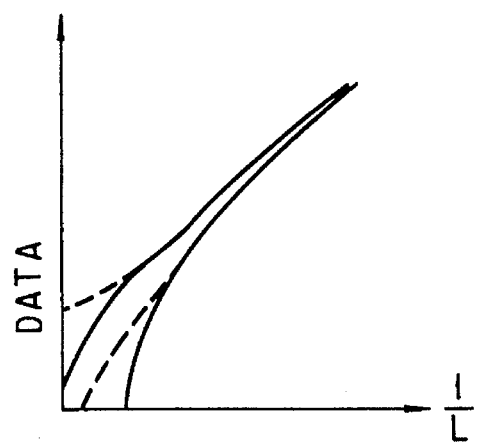
F I G. 8A
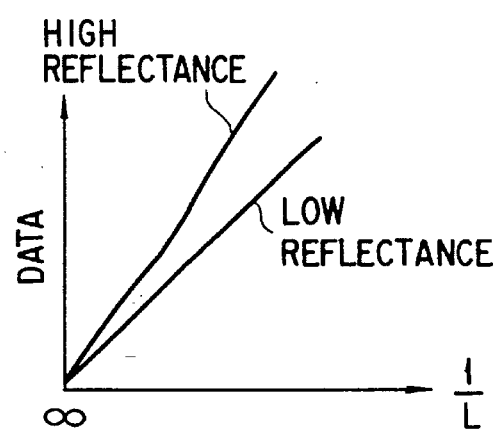
F I G. 8B
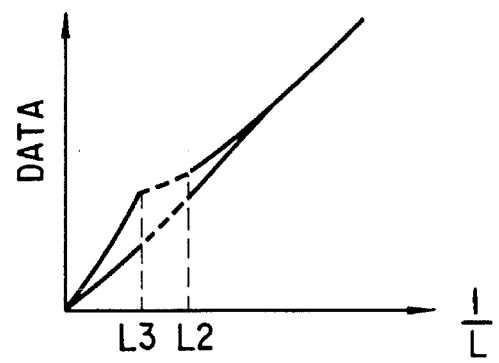
F I G. 8C

DISTANCE MEASURING DEVICE FOR HIGH-PRECISELY MEASURING GREAT LONG DISTANCE RANGE FOR AUTO FOCUSING IN CAMERA

BACKGROUND OF THE INVENTION

1. Field of the Invention

The present invention generally relates to a camera and, more particularly, to an active type distance measuring device for auto-focusing in a camera which radiates distance measurement light on an object to be photographed, and detects the object distance in accordance with the reflected signal light of the distance measurement light.

2. Description of the Related Art

Conventionally, an active trigonometric distance measuring device which radiates light such as infrared light toward an object to be photographed, receives a signal light beam reflected by the object via a light-receiving lens separated from a light-emitting means by a base length, and detects its incident position to detect the object distance is known as a distance measuring device for auto-focusing used for a camera.

It is well-known that the light beam incident position is detected by an optical position sensing device (PSD) constituted by a semiconductor, and it is described in, e.g., Jpn. Pat. Appln. KOKAI Publication No. 50-23247.

The present applicant proposes a distance measuring device which performs distance measurement at different distances upon switching, and calculates not only a light beam incident position but also an amount of incident light beam in accordance with an output signal from a PSD to calculate the object distance, according to Jpn. Pat. Appln. KOKAI Publication No. 1-291111.

However, it is difficult to perform distance measurement with respect to an object in a long distance range with the above active trigonometric distance measuring device which uses a PSD for distance measurement. That is, an amount of incident signal light beam reflected by the object at a long distance is at a very low level of about 1 nA or 2 nA, and as a matter of course, an output current from the PSD is 1 nA or less. For this reason, noise produced from a circuit in amplification calculation of the signal tends to be superposed.

As described in Jpn. Pat. Appln. KOKAI Publication No. 1-291111, the present applicant proposes a distance measuring device using an amount of signal light beam reflected by the remote object. In this scheme, however, distance measurement is affected by the reflectance corresponding to a color of the object, and even if an object, e.g., a person in a white dress and an object, e.g., a person in a black dress position at the same distance, distance measurement results tend to be different.

SUMMARY OF THE INVENTION

It is, therefore, an object of the present invention to provide a new and improved distance measuring device for auto-focusing in a camera in which high-precision distance measurement can be performed without being affected by the reflectance of an object to be photographed even when the object is in a long distance range from which a proper amount of reflected light beam cannot be obtained.

According to the present invention, there is provided a distance measuring device for a camera, comprising:

light-emitting means for projecting distance measurement light to an object to be photographed;

light-receiving means for receiving a reflected light beam from the object, and outputting a pair of current signals corresponding to an incident position of the reflected light beam, and a light amount signal corresponding to an amount of received light beam;

storage means for storing a correction value associated with a noise component which is superposed on outputs from said light-receiving means and does not depend on a distance to the object; and calculating means for calculating the distance to the object on the basis of the pair of current signals using the light amount signal output from said light-receiving means and the correction value stored in said storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 8A, 8B, and 8C are graphs showing relationships between data and the reciprocal 1/L of a distance;

DETAILED DESCRIPTION OF THE PREFERRED EMBODIMENTS

Figure 1A:
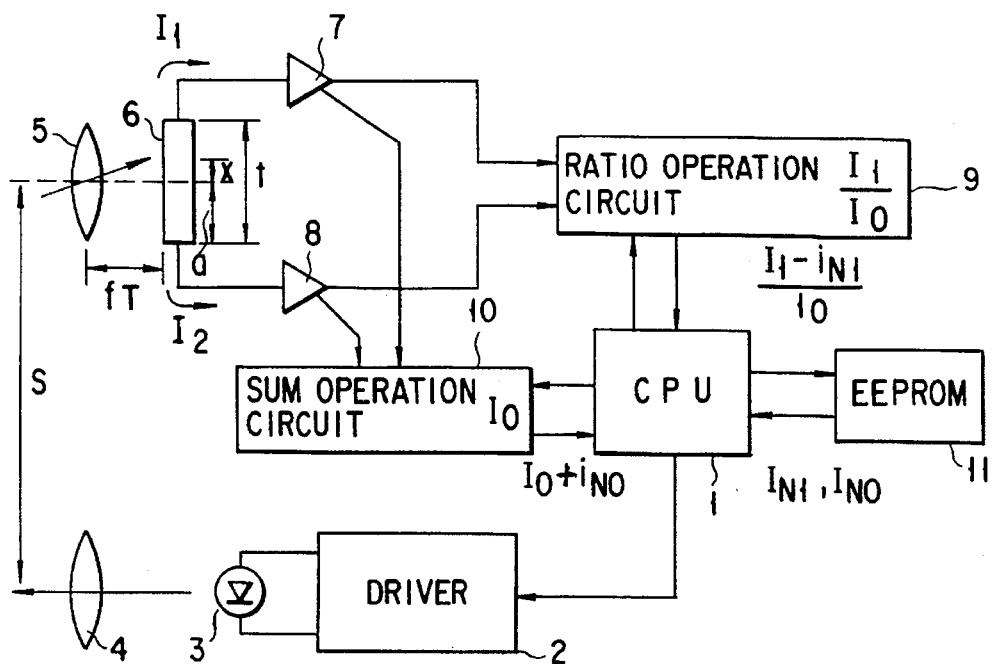
FIG. 1A is a diagram showing the conceptional arrangement of a distance measuring device used for the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIG. 1A is a diagram showing the conceptional arrangement of a distance measuring device section particularly used for auto-focusing in a camera as the first embodiment of the present invention.

In this distance measuring device, an arithmetic and control circuit (CPU) 1 constituted by a one-chip microcomputer and the like performs sequence control on the overall device, and calculation upon reception of output signals from circuit sections (to be described later) to calculate an object distance. The CPU 1 drives an infrared-emitting diode (IRED) 3 via a driver 2. Emitted light is focused via a lens 4, and serves as distance measurement light to be emitted on an object to be photographed (not shown).

A signal light beam reflected by the object is focused via a lens 5, and incident on a PSD 6. The PSD 6 is an optical position sensing element which is constituted by a semiconductor and has a function of converting the reflected signal light beam into a current $I_0$ proportional to the intensity of the light beam, and further dividing the current $I_0$ into two current signals $I_1$ and $I_2$ at a ratio dependent on an incident position x. Letting t be the length of a light-receiving surface of the PSD 6, and a be the origin of the position x, $$I_1 + I_2 = I_0 \qquad (1)$$

$$\frac{I_1}{I_0} = \frac{a+x}{t} \qquad (2)$$

The output currents $I_1$ and $I_2$ are amplified by preamplifiers 7 and 8. Thereafter, the amplified currents are respectively input to a ratio calculation circuit 9 for calculating a ratio $I_1/I_0$, and a sum calculation circuit 10 for detecting the $I_0$ on the basis of $I_1+I_2$. An electrically programmable non-volatile memory (EEPROM) 11 prestores error components of the ratio calculation circuit 9 and the sum calculation circuit 10. As described above, the CPU 1 calculates an object distance L in accordance with the ratio calculation circuit 9, the sum calculation circuit 10, and contents stored in the EEPROM 11, in a manner to be described later.

Error components of the above circuits (the ratio calculation circuit 9 and the sum calculation circuit 10) will be described below with reference to FIGS. 1B and 1C.

Figure 1B:
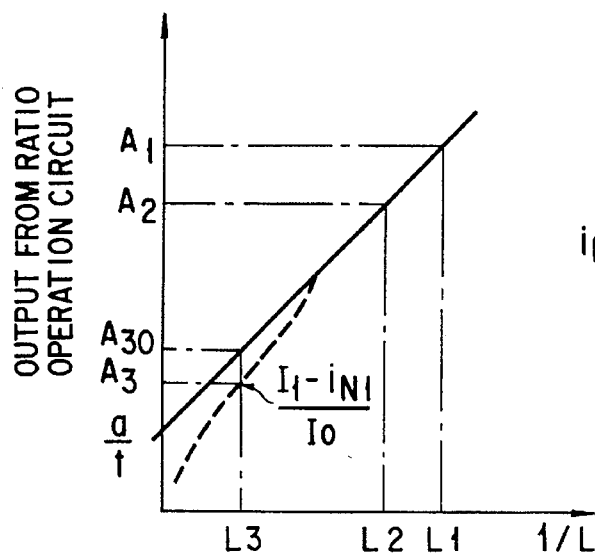
FIGS. 1B and 1C are graphs for explaining error components.

FIG. 1B shows a relationship between an output from the ratio calculation circuit 9 and the reciprocal of the object distance L. Letting s be a distance between the principal points of the lenses 4 and 5, and $f_j$ be the focal distance of the light-receiving lens 5. By the principle of trigonometric distance measurement, a relationship between these elements and the signal light beam incident position x is represented as follow:

$$x = \frac{s \cdot f_j}{L} \qquad (3)$$

This relationship is substituted into equation (2) to obtain:

$$\frac{I_1}{I_0} = \frac{a + \frac{s \cdot f_j}{L}}{t} = \frac{a}{t} + \frac{s \cdot f_j}{t} \cdot \frac{1}{L} \qquad (4)$$

An output from the ratio calculation circuit 9, therefore, is ideally represented by a graph indicated by a solid line shown in FIG. 1B which is proportional to the reciprocal 1/L of the object distance. However, as the distance is increased, a reflected signal light beam reduces, in practice. For this reason, the influence of an error component $i_{N1}$ supplied to the ratio calculation circuit 9 cannot be ignored, and the output from the ratio calculation circuit 9 is actually represented by a graph indicated by a dotted line.

Figure 1C:
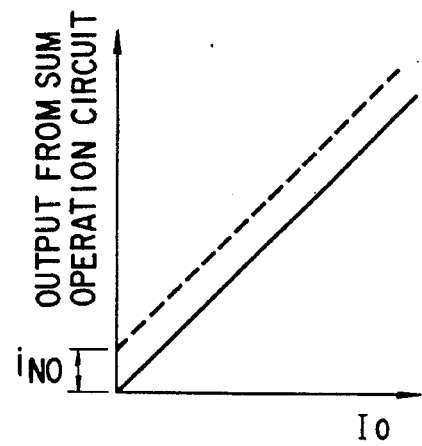

FIG. 1C is a graph showing an output from the sum calculation circuit 10 for obtaining the output current $I_0$ on the basis of $I_1+I_2$. An error component $i_{N0}$ of the sum calculation circuit 10 causes to produce an error between the actual graph indicated by the dotted line and the ideal relationship (indicated by the solid line).

According to the present invention, correction values $I_{N1}$ and $I_{N0}$ corresponding to the error components $i_{N1}$ and $i_{N0}$ caused by variations in characteristics and the like produced in forming the above circuits are prestored in the EEPROM 11 in a manufacturing stage. The output result from the ratio calculation circuit 9 is corrected by using these correction values and the output from the sum calculation circuit 10 to perform accurate distance measurement operation.

Note that factors producing the error components of the circuits are variations in power-supply voltage with emission of light from the IRED 3, directivity of noise such as induced noise or noise of the CPU 1, reproducible noise, an offset of each circuit, variations and unbalance in workmanship, leakage from a capacitor (to be described later), and the like.

The operation of the distance measuring device having the arrangement shown in FIG. 1A will be described below with reference to a flow chart in FIG. 2.

After light is emitted from the IRED 3, the CPU 1 reads the output $I_0$ proportional to a light current generated in the PSD 6 from the sum calculation circuit 10 (step S1). In the same manner, the CPU 1 reads the calculation result $I_1/I_0$ from the ratio calculation circuit 9 (step S2).

The CPU 1 reads out the prestored correction values $I_{N1}$ and $I_{N0}$ from the EEPROM 11 (step S3). The correction values $I_{N1}$ and $I_{N0}$ are values for canceling the error components $i_{N1}$ and $i_{N0}$ of the circuits.

The output current $I_0$ from the sum calculation circuit 10 includes the error component, i.e., is actually $I_0+i_{N0}$. The CPU 1 performs subtraction using the correction value $I_{N0}$ as follow:

$$I_0 + i_{N0} - I_{N0} = I_0 \qquad (5a)$$

thereby obtaining a proper output current $I_0$.

The output current $I_1/I_0$ from the ratio calculation circuit 9 includes the error component, i.e., is actually $(I_1-i_{N1})/I_0$. If $I_{N1}/I_0$ is added, a proper value can be obtained. The value $I_0$ is calculated according to equation (5a). The CPU 1 performs correction calculation with respect to the outputs $I_0$ and $I_1/I_0$ from the circuits to calculate a proper $I_1/I_0$ according to $(I_1/I_0)+I_{N1}/(I_0-I_{N0})$ (step S4). The distance L is calculated according to equation (4) using $I_1/I_0$ obtained in this manner (step S5).

The above correction coefficients $I_{N0}$ and $I_{N1}$ are stored in the EEPROM 11 at a factory or the like in manufacturing a camera. The adjustment system and steps will be described with reference to a diagram showing the arrangement in FIG. 3A.

In this arrangement, a camera 12 mounting the distance measuring device of the present invention is connected to a personal computer 13. The personal computer 13 causes the camera 12 to perform a distance measurement operation for auto-focusing, and calculates the correction coefficients $I_{N1}$ and $I_{N0}$ from the result to write the correction coefficients in the EEPROM 11 (shown in FIG. 1) incorporated in the camera. In performing the distance measurement operation, the personal computer 13 controls a mask slide device 14, and chart switching devices 15, 16, and 17.

A light-shielding mask 18 is moved using the mask slide device 14 to set a state of covering the light-emitting lens of the camera 12 and a state of releasing the light-emitting lens. Distance measurement is performed in the covered state so as to prevent a reflected light beam from being incident on the PSD 6.

The chart switching devices 15 to 17 can insert/remove charts 15a, 16a, and 17a respectively located at positions of distances $L_1$, $L_2$, and $L_3$ in/from distance measurement points.

Steps of calculating the correction coefficients and writing them in the EEPROM 11 in accordance with the adjustment system will be described with reference to a flow chart in FIG. 3B.

The personal computer 13 moves the light-shielding mask 18 to the front of the light-emitting lens (not shown) of the camera 12 using the mask slide device 14 to shield light emitted via the light-emitting lens (step S10). The personal computer 13 reads out the sum calculation result using the distance measuring circuit (the sum calculation circuit 10 shown in FIG. 1) in the light-shielded state (step S11). Since the output current $I_0$ is not generated by the PSD 6, an output at this time is an error component. The personal computer 13 stores the result as the correction coefficient $I_{N0}$ in its internal memory.

The personal computer 13 moves the light-shielding mask 18 via the mask slide device 14 to release the light-shielded state and to emit distance measurement light on the chart 15a, and charts 15b and 15c (step S12). The personal computer 13 moves and sets the chart 15a to the position of the distance $L_1$ using the switching device 15 so as to perform distance measurement (step S13).

Distance measurement is performed in this set state. The personal computer 13 stores an output $A_1$ of the distance $L_1$ from the ratio calculation circuit 9 (shown in FIG. 1) in the internal memory (step S14).

The personal computer 13 subsequently switches the chart 15a to the charts 15b and 15c at the positions of the distances $L_2$ and $L_3$ using the chart switching devices 16 and 17, and sets them so as to repeat the same distance measurement (steps S15 to S18). The personal computer 13 stores ratio calculation results of an output $A_2$ of the distance $L_2$, and an output $A_3$ of the distance $L_3$ in the internal memory.

The personal computer 13 sets the chart 17a to the position of the distance $L_3$ so as to perform distance measurement, and stores a sum calculation result $B_3$ from the sum calculation circuit 10 (shown in FIG. 1) in the internal memory.

The personal computer 13 calculates the correction data $I_{N1}$ using the data $A_1$, $A_2$, $A_3$, and $B_3$ obtained in the above steps. First of all, the personal computer 13 calculates theoretical data $A_30$ (see FIG. 1) obtained from the chart at the position of the distance $L_3$ on the basis of the data $A_1$ and $A_2$ of the distances $L_1$ and $L_2$ (step S20). At this time, the distances $L_1$ and $L_2$ are assumed to be relatively short distances. A signal light current is much larger than the error component $i_{N1}$ of the circuit at each distance, and the outputs $A_1$ and $A_2$ of the circuit 15 are considered to be theoretical as shown in FIG. 1B.

The personal computer 13 obtains the correction coefficient $I_{N1}$ for causing the distance measurement result $A_3$ of the distance $L_3$ to match the data $A_30$ (step S21).

Figure 2:
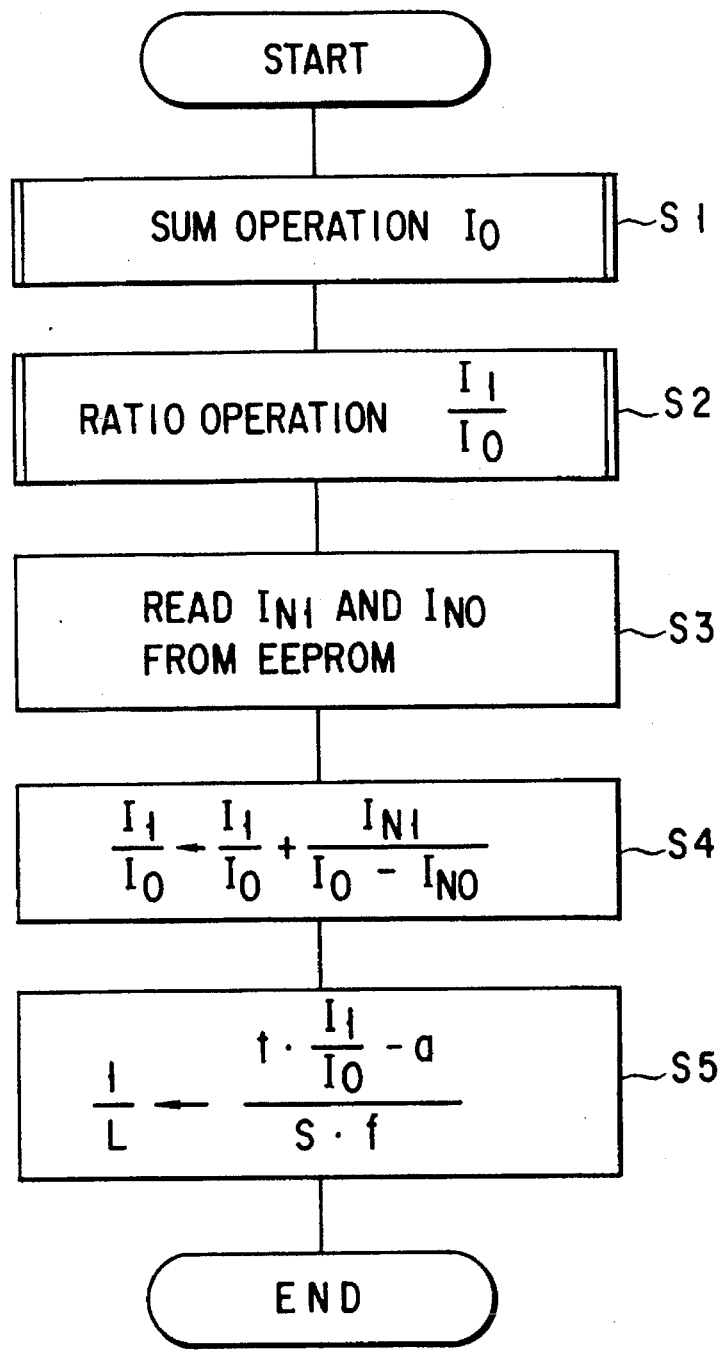
FIG. 2 is a flow chart for explaining the operation of the distance measuring device having the arrangement shown in FIG. 1.

On the basis of $I_{N1}/(I_0-I_{N0})$ shown in step S4 of FIG. 2 and the relationship shown in FIG. 1B, $$A_{30} = A_3 + \frac{I_{N1}}{B_3 - I_{N0}} \tag{5b}$$

and therefore, the correction coefficient $I_{N1}$ can be obtained from the following relationship:

$$I_{N1} = (B_3 - I_{N0}) \times (A_{30} - A_3) \tag{5c}$$

The personal computer 13 writes the obtained correction coefficients $I_{N0}$ and $I_{N1}$ in the EEPROM 11 (step S22).

The embodiment described above exemplifies that the error component $i_{N1}$ of the circuit affects the ratio calculation circuit 9 in the form of $(I_1-i_{N1})/I_0$. However, two error components $i_{N1}$ and $i_{N3}$ have to be often taken into consideration in the form of $(I_1-i_{N1})/(I_0-i_{N3})$ in accordance with a circuit arrangement and the kind of included noise.

An arrangement and a flow chart for calculating coefficients for correcting an error caused by these two error components will be described with reference to FIGS. 4A and 4B.

Figure 3A:
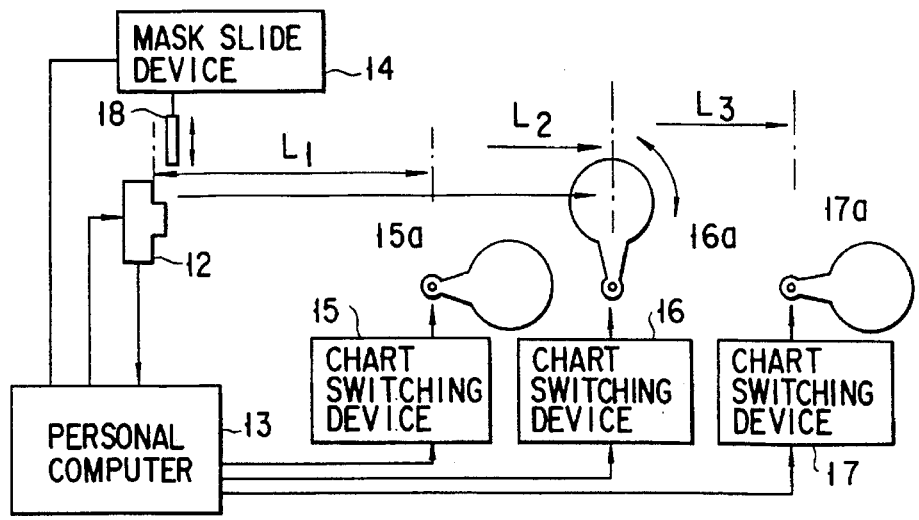
FIG. 3A is a diagram showing an adjustment system for storing correction coefficients in a memory as the first example.
Figure 3B:
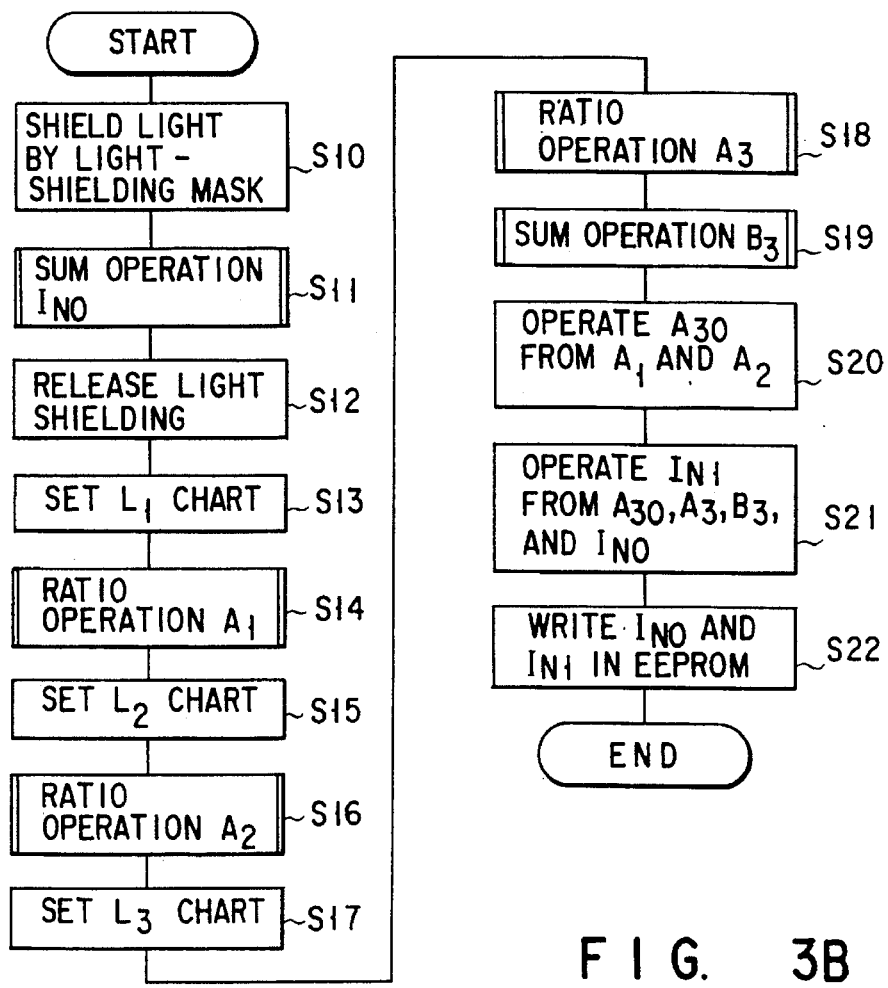
FIG. 3B is a flow chart showing adjustment steps.
Figure 4A:
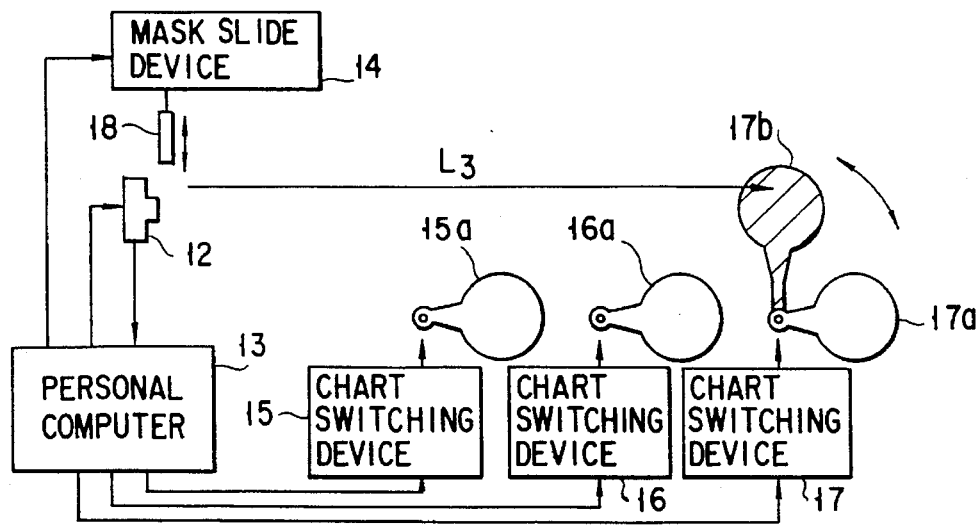
FIG. 4A is a diagram showing an adjustment system having a black chart for storing the correction coefficients in the memory as the second example.

The arrangement shown in FIG. 4A is different from that shown in FIG. 3A is that a chart (black chart) 17b having a reflectance different from that of the chart 17a at the position of the distance $L_3$ can be switched. Steps S30 to S39 in FIG. 4B correspond to steps S10 to S19 in FIG. 3B, and a detailed description thereof will be omitted.

The personal computer 13 switches the chart to the black chart 17b (distance $L_3$) using the chart switching device 17 (step S40), and sets it so as to perform distance measurement with respect to the black chart 17b. The personal computer 13 obtains a ratio calculation result $A_4$ from the ratio calculation circuit 9 shown in FIG. 1 (step S41) and a sum calculation result $B_4$ from the sum calculation circuit 10 (step S42). The personal computer 13 stores the results in the internal memory. The personal computer 13 calculates correction coefficients $I_{N1}$ and $I_{N3}$ on the basis of the obtained distance measurement results $A_1$, $A_2$, $A_3$, $A_4$, $B_3$, and $B_4$ (step S43). That is, the personal computer 13 calculates the theoretical value $A_30$ at the distance $L_3$, in the same manner as in FIGS. 3A and 3B, by solving the following simultaneous equations:

$$\begin{aligned} A_{30} &= \left( A_3 + \frac{I_{N1}}{I_0 + I_{N3}} \right) \times \left( 1 - \frac{I_{N3}}{I_0} \right) \\ &= A_3 \frac{I_0 - I_{N3}}{I_0} + \frac{I_{N1}}{I_0} \\ &= A_3 + \frac{1}{I_0} (I_{N1} - A_3 \cdot I_{N3}) \\ &= A_3 + \frac{1}{B_3 - I_{N0}} (I_{N1} - A_3 \cdot I_{N3}) \end{aligned} \tag{6a}$$

similarly, $$A_{30} = A_4 + \frac{1}{B_4 - I_{N0}} (I_{N1} - A_4 \cdot I_{N3}) \tag{6a'}$$

Thereafter, the personal computer 13 calculates the correction coefficients $I_{N1}$ and $I_{N3}$ on the basis of the obtained theoretical value $A_30$ according to the following equations:

$$I_{N3} = \frac{(A_{30} - A_3)(B_3 - I_{N0}) - (A_{30} - A_4)(B_4 - I_{N0})}{A_3 + A_4} \quad (6b)$$

$$I_{N1} = (A_{30} - A_4)(B_4 - I_{N0}) + A_4 \cdot I_{N3} \quad (6c)$$

Subsequently, the personal computer 13 writes the correction coefficients $I_{N0}$, $I_{N1}$, and $I_{N3}$ obtained in this manner in the EEPROM 11 (step S44), and a series of operations are ended.

As described above, even if the error components $i_{N1}$ and $i_{N3}$ are involved in the ratio calculation circuit 9 (shown in FIG. 1) in the form of $$(I_1 - i_{N1})/(I_0 - i_{N3}) \quad .$$

in accordance with a circuit arrangement, accurate distance measurement can be performed.

Figure 5:
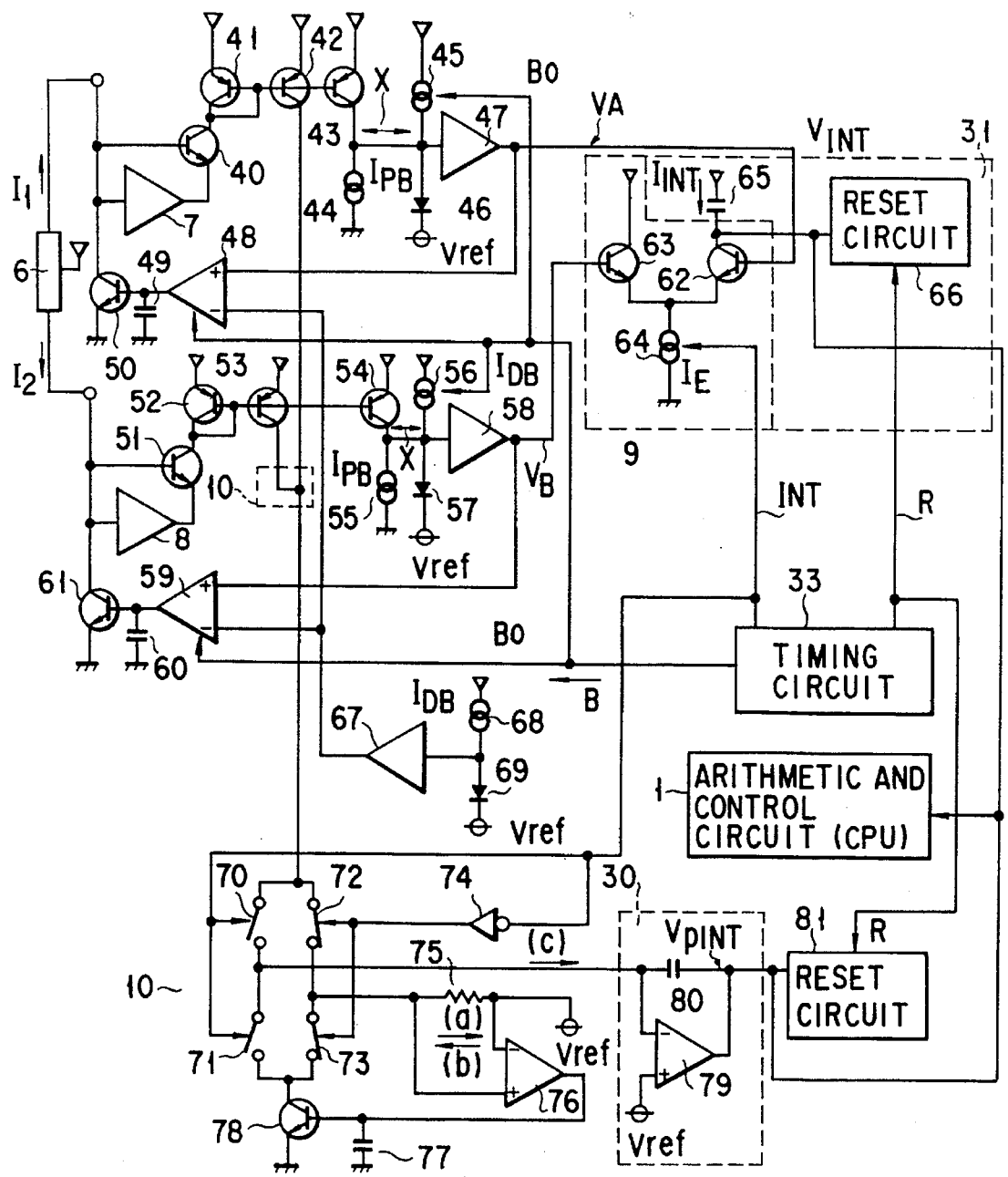
FIG. 5 is a diagram showing a detailed arrangement of a distance measuring device used for the second embodiment of the present invention.

FIG. 5 is a diagram showing a detailed arrangement of a distance measuring device section used for the second embodiment of the present invention. The same reference numerals as in FIG. 1 denote the same components in the second embodiment, and a detailed description thereof will be omitted. Circuit systems for amplifying two signals of light currents $I_1$ and $I_2$ generated in a PSD 6, supplying them to a sum calculation circuit 10 and a ratio calculation circuit 9, and comparing them with each other are identically formed, and only one circuit system for the light current $I_1$ will be described below.

Generally, since an object to be photographed is ordinarily irradiated with light such as sunbeams and artificial illumination light, such ordinary light other than signal light is incident on the PSD 6 incorporated in a camera having a distance measuring device for auto-focusing. A current including an ordinary light current $I_{30}$ by the ordinary light is output from the PSD 6.

Therefore, in a distance measurement calculation for auto-focusing, the ordinary light current $I_{30}$ must be removed, and only the signal light currents $I_1$ and $I_2$ by an IRED (not shown) must be discriminated and extracted.

An operation of removing the ordinary light current will be described.

Since the component of the ordinary light current $I_{30}$ does not basically change in both a state wherein the IRED does not emit light and a state wherein it emits light, discrimination of the ordinary light current $I_{30}$ and the signal light currents $I_1$ and $I_2$ is performed by determining that those which change are the signal light currents $I_1$ and $I_2$. The reference numerals in parentheses denote components for processing the signal light current $I_2$ side.

Before emission of light from the IRED, an ordinary light current $I_{30}$ from the PSD 6 is amplified by a transistor 40 (51). The amplified current flows in a compression diode 46 (57) via a current mirror circuit constituted by transistors 41 and 43 (52 and 54). When the potential of the compression diode 46 (57) becomes high upon reception of the current $I_{30}$, a hold amplifier 48 (59) operates to control the base potential of a transistor 50 (61), and emits the ordinary light current $I_{30}$ to GND.

A voltage of the compression diode 46 (57) biased with a constant current $I_{D3}$ from a constant-current source 45 (56) is applied to the positive input terminal of the hold amplifier 48 (59) via a buffer 47 (58). A voltage of a compression diode 69 biased with the constant current $I_{D3}$ from a constant-current source 68 is applied to the negative input terminal of the hold amplifier 48 (59) via a buffer 67.

With this operation, while the hold amplifier 48 (59) functions, a current including the ordinary light current $I_{30}$ does not flow in the compression diode 46 (57). That is, this circuit is stable in a state wherein a current does not flow through a line represented by an arrow x.

Upon emission of light from the IRED, the ordinary light current $I_{30}$ added with the signal light current $I_1$ ($I_2$) is input to a preamplifier 7 (8). At this time, in synchronism with the emission of light from the IRED, the hold amplifier 48 (59) is turned off. The transistor 50 (61) is turned on by a potential charged in a hold capacitor 49 (60), and the ordinary light current $I_{30}$ is emitted to GND.

With this operation, only the signal light current $I_1$ ($I_2$) is amplified by the transistor 40 (51), and flows in the compression diode 46 (57) via the current mirror circuit constituted by the transistors 41 and 43 (52 and 54). At this time, since the constant-current source 45 (56), similar to the hold amplifier 48 (59), is turned off by a bias-cut signal B output from a timing circuit 33 through a line represented by reference symbol B0 in FIG. 5, a compression voltage by only the signal light current $I_1$ is generated in the compression diode 46. In the same manner, the ordinary light current $I_{30}$ is removed from the signal light current $I_2$, and the resultant signal light current $I_2$ flows in the compression diode 57.

Compression voltages $V_A$ and $V_B$ are input to the ratio calculation circuit 9 constituted by transistors 62 and 63, a constant-current source 64, and an integral capacitor 65 via the buffers 47 and 58. The ratio calculation circuit 9 constitutes a second integral circuit 31 together with a reset circuit 66.

The constant-current source 64 is turned on by the timing circuit 33 in synchronism with the emission of light from the IRED. Since an integral current $I_{INT}$ in the ratio calculation circuit 9 satisfies the following relationship:

$$I_{INT} = \frac{I_1}{I_1 + I_2} \cdot I_E = \frac{I_1}{I_0} \cdot I_E \quad (7)$$

a voltage signal obtained by the following equation:

$$V_{INT} = n \cdot \frac{I_1}{I_0} \cdot I_E \cdot \frac{\tau}{C} \quad (8)$$

is generated in the integral capacitor 65.

Where n is the number of emission operations of the IRED, $I_E$ is the current value of the constant-current source 64, $\tau$ is the integral time for each operation, and C is the capacitance of the integral capacitor 65.

The reset circuit 66 initializes the potential of the integral capacitor 65 prior to the emission of light from the IRED to set the integral voltage $V_{INT}=0$.

A CPU 1 performs A/D conversion to read the integral voltage $V_{INT}$ in equation (8). According to equations (4) and (8) using $a=t/2$, the following equation:

$$\frac{1}{L} = \frac{t}{s \cdot f_J} \left( \frac{C \cdot V_{INT}}{n \cdot I_E \cdot \tau} - \frac{1}{2} \right) \quad (9)$$

is established. For this reason, distance information 1/L can be obtained on the basis of $V_{INT}$. The operation of the ratio calculation circuit has been described.

Next, a sum calculation operation will be described.

In the sum calculation operation, in the same manner as in the ratio calculation operation described above, the amplified signal light current $I_1$ is led to a sum signal integral circuit by a current mirror circuit constituted by the transistor 41 and a transistor 42. The similarly amplified signal light current $I_2$ is added to the signal light current $I_1$ in a current mirror circuit constituted by the transistor 52 and a transistor 53. The reference numerals in parentheses denote components at the signal light current $I_2$ side.

A bias current constantly flows through the transistors 42 and 53 constituting the current mirror circuit in addition to the signal light currents $I_1$ and $I_2$. This is because the transistors 40, 41, 42, and 43 (51, 52, 53, and 54) are constantly biased in an operation state to prevent degradation in response of the IRED to a signal current. In a state wherein the current through the line represented by the arrow x is "0" by the operation of removing the ordinary light described above, the transistors are biased with a constant current $I_{PB}$ from a constant-current source 44 (55).

For this reason, the sum signal integral circuit is constituted to remove a bias applied by the constant current $I_{PB}$ and to integrate only the signal light currents $I_1$ and $I_2$. That is, before the emission of light from the IRED (not shown), the currents flowing from the transistors 42 and 53 are removed, only the currents $I_1$ and $I_2$ are integrated, and the same operation as that in the ordinary light removing circuit is performed.

Before the emission of light from the IRED, switches 72 and 73 of a switching circuit connected to the sum calculation circuit 10 are kept on, and switches 70 and 71 thereof are kept off.

With this operation, upon voltage drop caused when a current ($2 \times I_{PB}$) corresponding to two channels of the bias currents is to flow in a resistor 75, a hold amplifier 76 operates to turn on a transistor 78, and discharges the current to GND.

In this case, if the current is to flow in a direction represented by an arrow (a), the potential of the positive input terminal of the hold amplifier 76 increases, and a collector current is increased in the transistor 78 to suppress the flow toward the direction of the arrow (a). Alternatively, if the current is to flow in a direction represented by an arrow (b), the potential of the negative input terminal of the hold amplifier 76 increases, and the collector current is decreased in the transistor 78 to suppress the flow toward the direction of the arrow (b). Therefore, when the current is to flow in the resistor 75 in either of the directions, this circuit rapidly removes the current by the noise component including the bias current ($2 \times I_{PD}$).

Upon the emission of light form the IRED, the switches 72 and 73 are turned off and the switches 70 and 71 are turned on, in accordance with an integral signal INT from the timing circuit 33. With this operation, on the basis of the electric charge stored in a hold capacitor 77, while the bias current is discharged to GND, only a current on the basis of the signal light currents $I_1$ and $I_2$ is supplied to a first integral circuit 30 in a direction represented by an arrow (c). The first integral circuit 30 is constituted by a sum signal circuit comprising an integral amplifier 79 and an integral capacitor 80, and integrates the signal light currents $I_1$ and $I_2$.

Letting β be a current amplification factor of each of the amplification transistors 40 and 51, an output voltage $V_{PINT}$ from the integral amplifier 79 is:

$$V_{PINT} \frac{n \cdot \beta (I_1 + I_2) \cdot \tau}{C_P} = \frac{n \cdot \beta \cdot I_0 \cdot \tau}{C_P} \quad (10)$$

where $C_P$ is the capacitance of the integral capacitor 80.

In the same manner as in the ratio calculation operation, a reset circuit 81 resets the output voltage $V_{PINT}$ from the integral amplifier 79 to an initial state before the emission of light from the IRED. The CPU 1 reads the A/D-converted output voltage $V_{PINT}$ to obtain the distance information $1/L$ in accordance with following equation (12).

Assume that the reflectance of an object to be photographed is constant, and the overall spot of light emitted from the IRED is irradiated on the object. According to the principle of light diffusion, $$\frac{1}{L} = K \sqrt{I_1 + I_2} = K \sqrt{I_0} \quad (11)$$

where K; constant, and $I_0$; $I_1 + I_2$

Therefore, according to equations (11) and (10), the following equation is established:

$$\frac{1}{L} = K \sqrt{\frac{C_P \cdot V_{PINT}}{n \cdot \beta \cdot \tau}} \quad (12)$$

and the distance information $1/L$ can be obtained.

An auto-focusing (AF) operation by the distance measuring device having the above arrangement will be described below with reference to a timing chart shown in FIG. 6.

Figure 6:
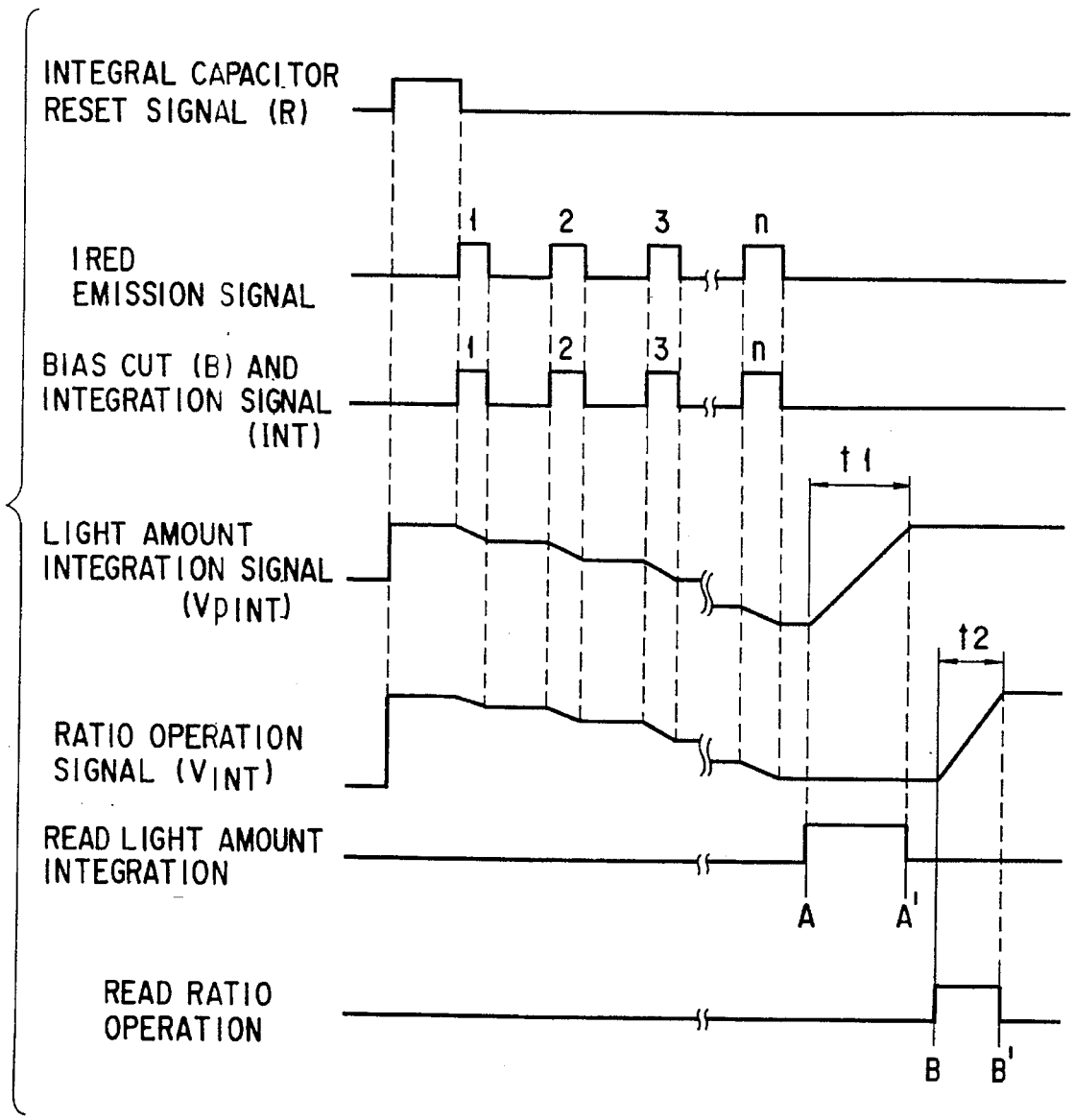
FIG. 6 is a timing chart for explaining a distance measurement operation of the distance measuring device of the second embodiment.

As shown in FIG. 6, the CPU 1 reads out the light amount integral signal $V_{PINT}$ and the ratio calculation signal $V_{INT}$ at timings A and B. When A/D conversion is to be performed using well-known double integration, the CPU 1 reads times $t_1$ and $t_2$ at timings A' and B'.

The constant K in equation (12) greatly changes in accordance with variations in the amount of light from the IRED, the photoelectric conversion efficiency of the PSD 6, the amplification factors of the preamplifiers 7 and 8, and AF light-emitting and light-receiving lenses 4 and 5. In this embodiment, an EEPROM 11 (FIG. 1) prestores correction data for correcting the variations for each product, and distance measurement calculation can be realized with high precision according to equations (11) and (12).

Figure 7:
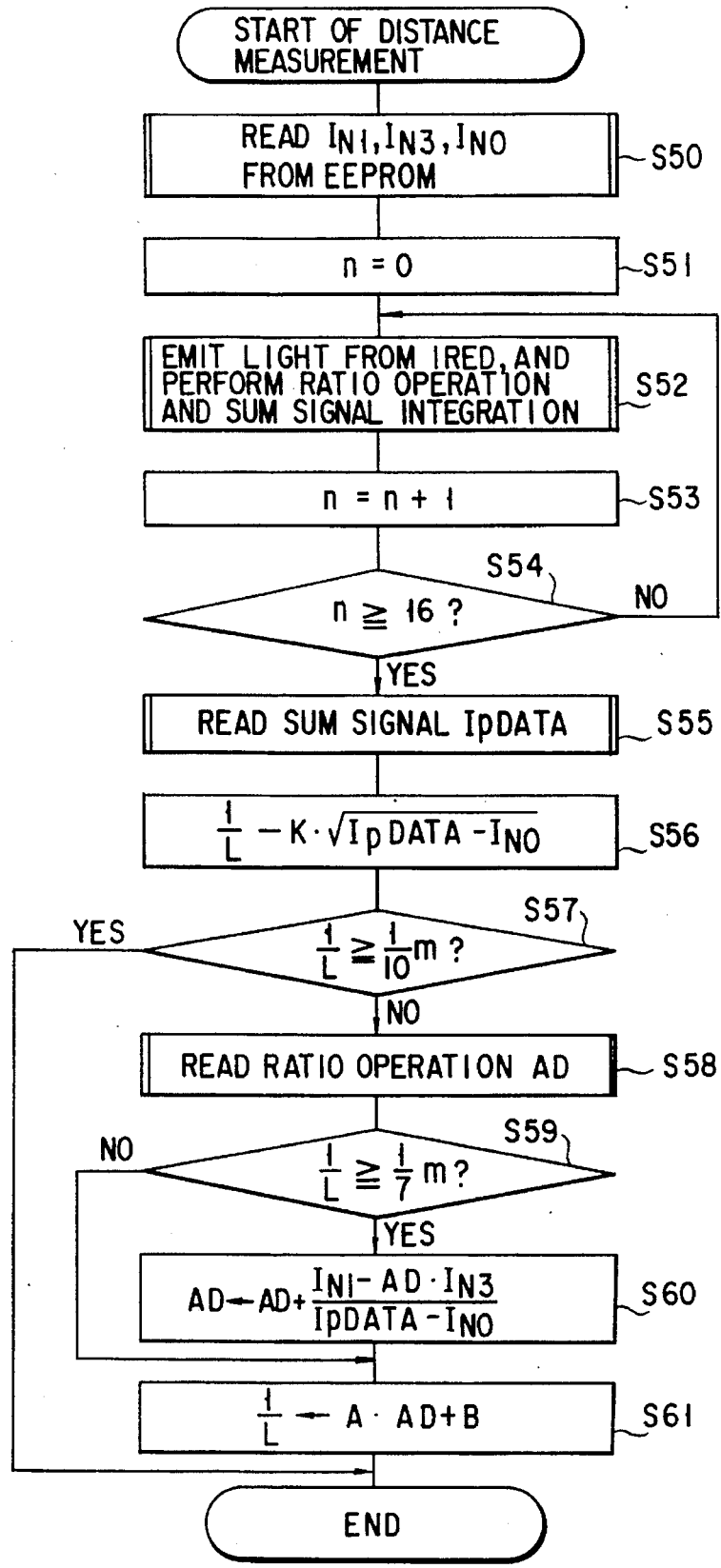
FIG. 7 is a flow chart for explaining the distance measurement operation of the distance measuring device shown in FIG. 5.

FIG. 7 shows a flow chart of calculating an actual distance in the distance measuring device. In this flow chart, equation (12) is simplified as follow:

$$\frac{1}{L} = K \sqrt{I_P \text{DATA}} \quad (13)$$

where $I_P \text{DATA}$ ($=I_0$) is the digital value obtained when the CPU 1 reads out the light amount integral signal $V_{PINT}$. Also, by representing a digital value obtained when the CPU 1 reads out the ratio calculation signal $V_{INT}$ as AD ($=I_1/I_0$), equation (9) is simplified:

$$\frac{1}{L} = A \cdot AD + B \quad (14)$$

where K, A, and B are the constants.

Figure 4B:
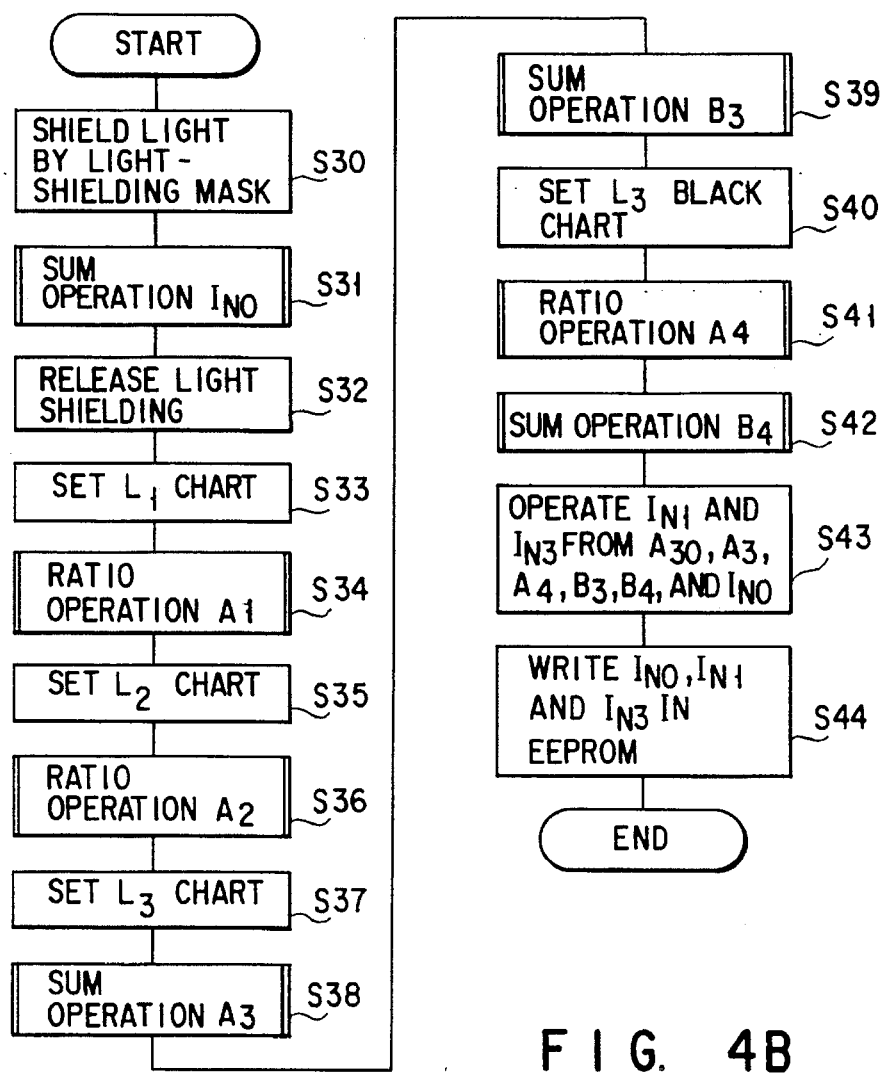
FIG. 4B is a flow chart showing adjustment steps.

First of all, in the steps shown in FIG. 4B, the CPU 1 reads out correction coefficients $I_{N1}$, $I_{N3}$, and $I_{N0}$ stored in the EEPROM 11 (step S50). The CPU 1 resets the number n of emission operations of an IRED (step S51), and performs ratio calculation and sum signal integration in synchronism with the emission of light from the IRED, which are described with reference to FIGS. 5 and 6 (step S52). The CPU 1 increments the number n (step S53), and determines whether the number of emission operations of the IRED reaches a predetermined number, e.g., 16 (step S54). With this operation, the emission of light from the IRED and integration of currents proportional to a reflected light beam of the light from the IRED are repeated 16 times.

After emission and integration are repeated by the predetermined number, the CPU 1 reads out the $I_P \text{DATA}$ obtained as a sum signal integration result in the integral capacitor 80 (step S55). The CPU 1 performs distance calculation $1/L \leftarrow K \sqrt{I_P \text{DATA} - I_{N0}}$ ($=K \sqrt{I_0 - I_{N0}}$) on the basis of equation (11) (step S56). Data obtained from this calculation becomes a result as shown in FIG. 8B with respect to the reciprocal of the object distance L. That is, the data depends on the reflectance of the object. However, since the output current $I_1 + I_2$ is "0" at an infinite (∞) distance regardless of the reflectance of the object, the influence of the reflectance is small at a long distance.

The CPU 1 determines whether the object distance L is longer than 10 m (step S57), and if YES, the CPU 1 employs the calculation distance obtained in step S56. If NO in step S57, the CPU 1 reads out the result AD of the ratio calculation $I_1/I_0$ from the capacitor 65 (step S58). The CPU 1 determines whether the object distance L is longer than 7 m (step S59). If NO in step S59, it is assumed that a signal is a sufficiently large value compared with an error component of the circuit, and the CPU 1 calculates the object distance L in accordance with distance calculation on the basis of equation (9) (step S61).

When the object distance L is longer than 7 m in step S59, i.e., falls within 7 m (YES) in step 59 to 10 m (NO) in step S57, a condition for performing correction calculation as the feature of the present invention is realized, and the CPU 1 performs correction of error components $i_{N0}$, $i_{N1}$, and $i_{N3}$ as described in FIGS. 4A and 4B. If the AD in equation (14) is $I_1/I_0$ used for the description in FIGS. 4A and 4B for the sake of simplicity, and the $I_PDATA$ in step S56 is simplified to be equal to $I_0$ according to equation (6a), the following relation, similar to equation 6(a), is established:

$$AD \leftarrow AD + \frac{1}{I_PDATA - I_{N0}} (I_{N1} - AD \cdot I_{N3}) =$$

$$(I_1/I_0) + \{I_{N1} - I_{N3} \cdot (I_1/I_0)\}/(I_0 - I_{N0})$$

The flow advances to step S60, and accurate distance measurement can be performed.

FIGS. 8A, 8B, and 8C show relationships between respective data and the reciprocal 1/L of the distance.

Solid lines shown in FIG. 8A represent a relationship between the sum calculation result and the reciprocal 1/L of the distance. As shown in FIG. 8A, as the distance is longer due to random noise of the circuit, a width between two lines is increased, and the linearity is degraded by directional noise and an error component of the circuit and the like. This is the performance of the conventional distance measuring device. Dotted lines shown in FIG. 8A represent an example wherein the linearity is improved by the correction calculation of the present invention. FIG. 8B is a graph showing a result of the above sum calculation distance measurement and the reciprocal 1/L of the distance. If distance measurement is performed in accordance with the distance measurement steps shown in FIG. 7, an error can be greatly decreased in a range from a short distance to a long distance, as shown in FIG. 8C.

Figure 9:
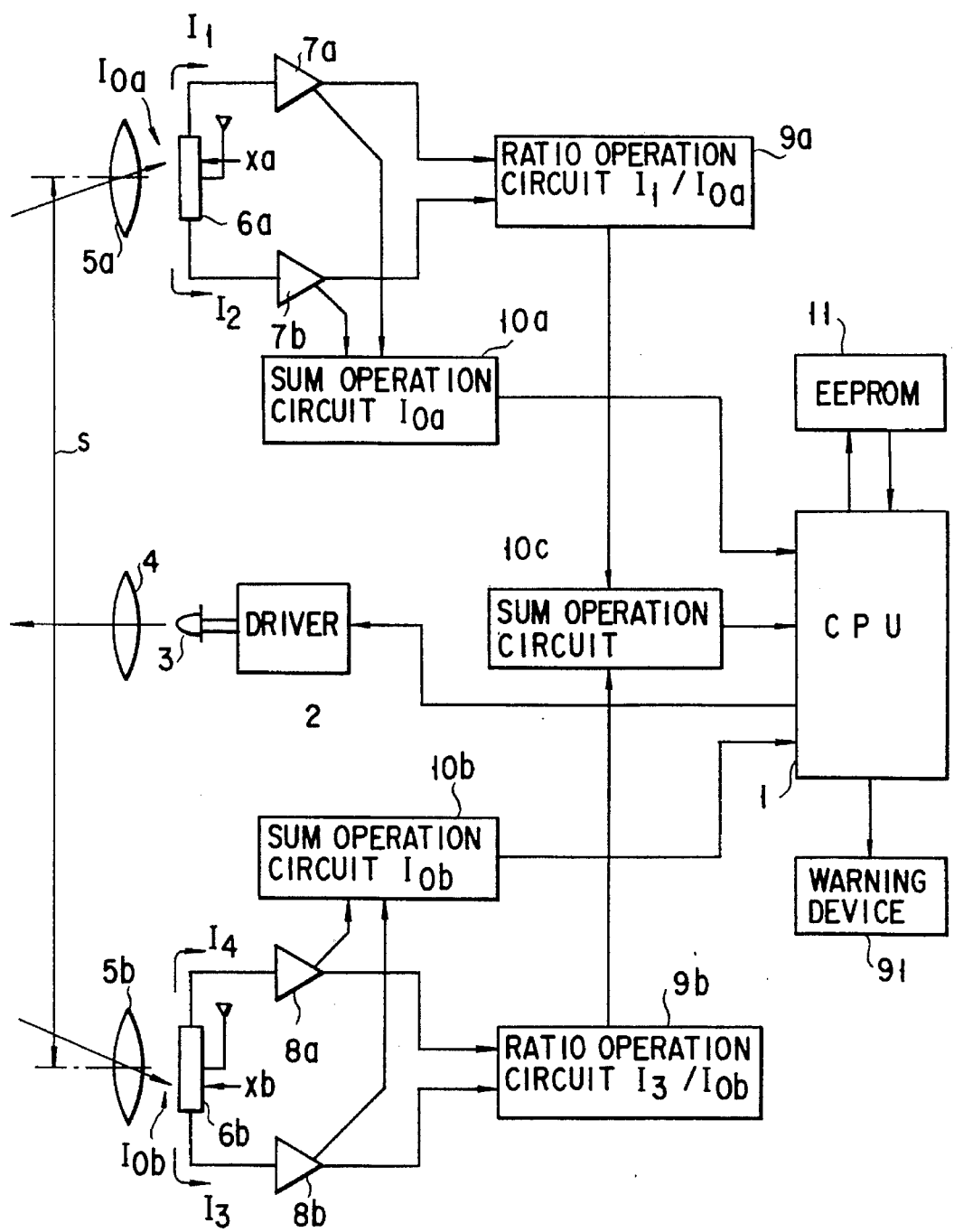
FIG. 9 is a diagram showing the arrangement of a (light-receiving twin-lens) distance measuring device having two light-receiving means as the third embodiment of the present invention.

FIG. 9 shows the arrangement of a (light-receiving twin-lens) distance measuring device having two light-receiving means as the third embodiment of the present invention.

In this distance measuring device, light is emitted on an object to be photographed (not shown) via a lens 4 from an IRED 3 which is driven by a driver 2. A reflected light beam of the light from the IRED 3 is irradiated on PSDs 6a and 6b via light-receiving lenses 5a and 5b at positions separated from each other by a base length s.

At this time, output currents $I_1$ and $I_2$, and output currents $I_3$ and $I_4$ are output from the PSDs 6a and 6b. Preamplifiers 7a, 7b, 8a, and 8b respectively amplify the output currents, and the amplified currents are input to ratio calculation circuits 9a and 9b, and sum calculation circuits 10a and 10b, in the same manner as in the circuits shown in FIG. 1. The results of the ratio calculation circuits 9a and 9b are added in an adder 10c, and the sum is input to a CPU 1.

When focal lengths $f_J$ of the two light-receiving lenses are the same in the light-receiving twin-lens distance measuring device like this embodiment, incident positions of the PSDs 6a and 6b are represented by $x_a$ and $x_b$. In this case, the reciprocal of an object distance L is obtained as follow:

$$\frac{1}{L} = \frac{x_a + x_b}{s \cdot f_J} \quad (15)$$

Letting a be each of the origins of $x_a$ and $x_b$, and t be each of the lengths of the PSDs 6a and 6b, and the following relationship is established:

$$x_a = \frac{I_1}{I_{0a}} \cdot t - a, \quad (16)$$

$$x_b = \frac{I_3}{I_{0b}} \cdot t - a$$

$$\frac{1}{L} \propto \frac{I_1}{I_{0a}} + \frac{I_3}{I_{0b}}$$

Therefore, the CPU 1 can obtain the object distance using the output from the adder 10c. Outputs from the sum calculation circuits 10a and 10b are input to the CPU 1, and the CPU 1 calculates the object distance L in accordance with the correction coefficients stored in an EEPROM 11, and the results of the adder 10c and the sum calculation circuits 10a and 10b.

A warning device 91 is connected to the CPU 1. When the outputs from the sum calculation circuits 10a and 10b are extremely unbalanced, the CPU 1 assumes a case wherein one lens is covered or the like to give a warning such as a sound or light to a user.

Figure 11:
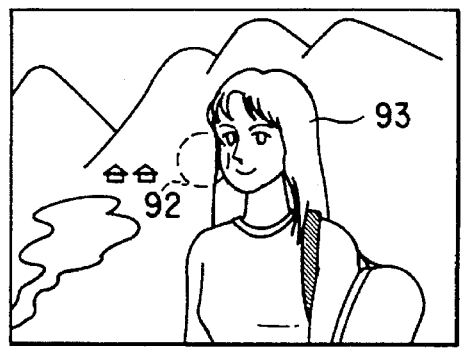
FIG. 11 is a view showing an example of a photographic composition.

As merits of the light-receiving twin-lens distance measuring device, even when an overall distance measurement light spot 92 projected on a photographic composition as shown in FIG. 11 is not completely irradiated on an object 93 to be photographed to cause a so-called spot omission, a shift between signal light beam incident positions of the PSDs 6a and 6b is canceled to perform accurate distance measurement.

As described with reference to FIG. 1B, however, even if an incident position x of a signal light beam is correct, an amount of reflected signal light beam is decreased by loss of the amount of light beam caused by the spot omission, resulting in an incorrect ratio calculation result. For this reason, it is difficult to fully utilize the above merits.

Distance measurement in the distance measuring device of the third embodiment will be described below with reference to the arrangement shown in FIG. 9 and a flow chart shown in FIG. 10.

In this distance measuring device, the CPU 1 controls light-emitting and light-receiving operations, and sum calculation results $I_{Oa}$ and $I_{Ob}$ are input to the CPU 1 from the sum calculation circuits 10a and 10b (step S70). Ratio calculation results 90a and 90b from the ratio calculation circuits 9a and 9b are added in the adder 10c, and the ratio calculation result is input to the CPU 1 (step S71).

In adjustment steps of the technique described with reference to FIG. 3, the CPU 1 reads out the correction coefficients $I_{N1}$ and $I_{N0}$ prestored in the EEPROM 11 (step S72). The CPU 1 performs correction calculation on the basis of the readout correction coefficients $I_{N1}$ and $I_{N0}$ in accordance with the same concept as that described with reference to equation (5b) (step S73).

The CPU 1 calculates the reciprocal of the object distance L on the basis of the corrected value with the technique according to equation (16) (step S74).

By focusing the camera in accordance with the distance value obtained in the above manner, accurate focusing can be performed even when the spot shifts as shown in FIG. 11. Almost all photographic compositions can be clearly photographed with accurate focusing.

Figure 10:
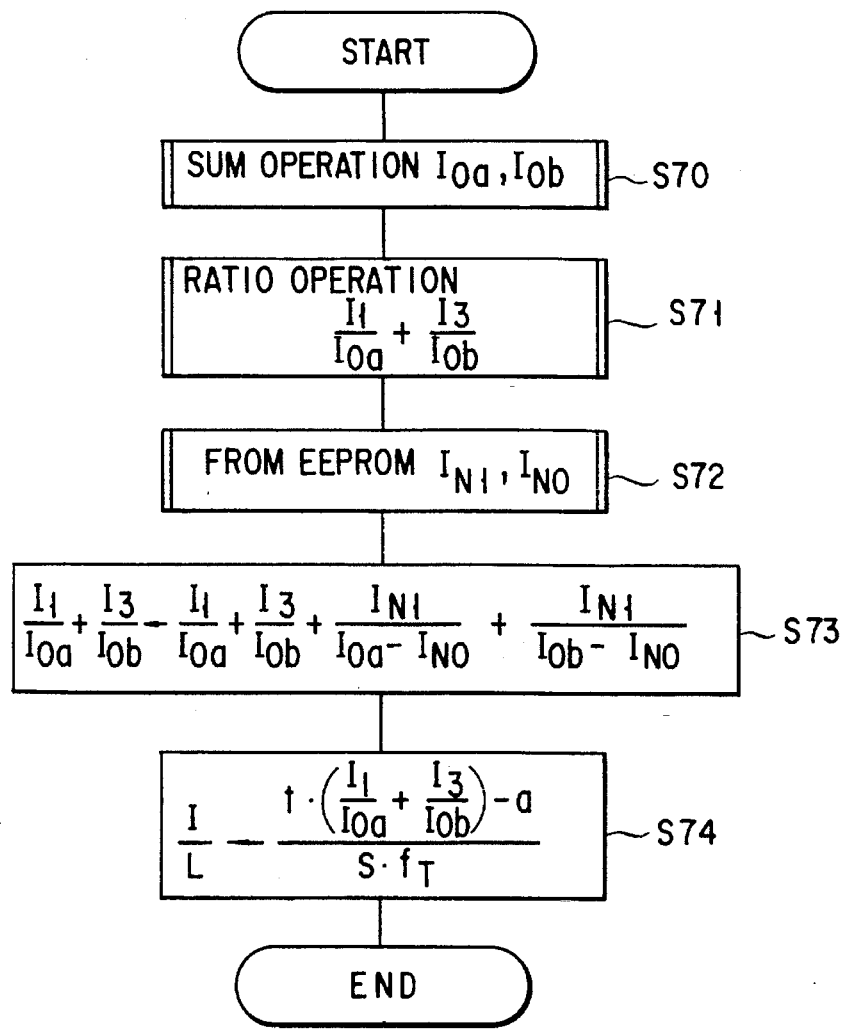
FIG. 10 is a flow chart for explaining a distance measurement operation of the distance measuring device shown in FIG. 9.

Since the extension amount of the focusing lens of the camera is proportional to the reciprocal of the object distance L, the flow charts in FIGS. 2, 7, and 10 describe that the CPU 1 calculates 1/L.

As described above, in the distance measuring device of the embodiments, high-precision distance measurement can be realized in a range from a short distance to a long distance without being affected by the reflectance of an object to be photographed.

Therefore, as has been described above, according to the present invention, there is provided the camera having the distance measuring device for auto-focusing in which high-precision distance measurement can be performed without being affected by the reflectance of an object to be photographed even when the object is in a long distance range from which a proper amount of reflected light beam cannot be obtained.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A distance measuring device for a camera, comprising:

light-emitting means for projecting distance measurement light to an object to be photographed;

light-receiving means for receiving a reflected light beam from the object, and outputting a pair of current signals corresponding to an incident position of the reflected light beam, and a light amount signal corresponding to an amount of received light beam;

storage means for storing a correction value associated with a noise component which is superposed on outputs from said light-receiving means and does not depend on a distance to the object; and calculating means for calculating the distance to the object on the basis of the pair of current signals using the light amount signal output from said light-receiving means and the correction value stored in said storage means.

2. A device according to claim 1, wherein said storage means includes an electrically programmable non-volatile memory, and the correction value is written in said non-volatile memory in manufacturing said camera.

3. A device according to claim 1, wherein, when the light amount signal is represented by $I_0$, a ratio of the pair of current signals is $I_1/I_0$, and the correction value which is stored in said storage means comprises $I_{N1}$, and $I_{N0}$, said calculating means includes means for performing sum calculation and ratio calculation, and means for calculating the object distance on the basis of:

$$(I_1/I_0)+I_{N1}/(I_0-I_{N0})$$

($I_{N1}$: ratio calculation correction value, $I_{N0}$: sum calculation correction value).

4. A device according to claim 1, wherein, when the light amount signal is represented by $I_0$, a ratio of the pair of current signals is $I_1/I_0$, and the correction value which is stored in said storage means comprises $I_{N1}$, $I_{N3}$, and $I_{N0}$, said calculating means includes means for performing sum calculation and ratio calculation, and means for calculating the object distance on the basis of:

$$(I_1/I_0)+\{I_{N1}-I_{N3}\cdot(I_1/I_0)\}/(I_0-I_{N0})$$

($I_{N1}$, $I_{N3}$: ratio calculation correction value, $I_{N0}$: sum calculation correction value).

5. A device according to claim 1, wherein when the light amount signal is represented by $I_0$, and the correction value which is stored in said storage means comprises $I_{N0}$, said calculating means includes means for calculating the object distance on the basis of:

$$K\cdot\sqrt{I_0-I_{N0}}$$

($K$; constant).

6. A device according to claim 1, wherein distance calculation by said calculating means using the light amount signal and the correction value is performed only when the object distance calculated on the basis of a ratio of the pair of current signals is larger than a predetermined distance.

7. A device according to claim 1, wherein said calculating means includes means for performing ratio calculation of the pair of current signals from said light-receiving means and sum calculation of the pair of current signals in accordance with analog calculation and, after integration of results of the analog calculation, performing A/D conversion and digital calculation of the object distance using the correction value.

8. A device according to claim 1, wherein said light-receiving means comprises a first light-receiving element at a position separated from said light-emitting means by a first base length, and a second light-receiving element at a position separated from said light-receiving element by a second base length.

9. A distance measuring device for a camera, comprising:

light-emitting means for projecting distance measurement light to an object to be photographed;

light-receiving means for receiving a reflected signal light beam from the object, and outputting a first signal depending on an incident position of the signal light beam, and a second signal depending on an amount of reflected signal light beam;

storage means for storing information associated with a noise component which is superposed on output signals from said light-receiving means; and calculating means for deciding an object distance on the basis of a value obtained by subtracting the information stored in said storage means from the second signal from said light-receiving means.

10. A device according to claim 9, wherein said storage means includes an electrically programmable non-volatile memory.

11. A distance measuring device for a camera, comprising:

light-emitting means for projecting distance measurement light to an object to be photographed;

light-receiving means for receiving a reflected signal light beam from the object, and outputting a first signal depending on an incident position of the signal light beam, and a second signal depending on an amount of reflected signal light beam;

storage means for storing information associated with a noise component which is superposed on output signals from said light-receiving means; and calculating means for deciding an object distance on the basis of a value obtained by adding/subtracting the information stored in said storage means to/from the second signal from said light-receiving means.

12. A distance measuring device for a camera, comprising:

light-emitting means for projecting distance measurement light to an object to be photographed;

light-receiving means for receiving a reflected signal light beam from the object, and outputting a first signal depending on an incident position of the signal light beam, and a second signal depending on an amount of reflected signal light beam;

storage means for storing information associated with a noise component which is superposed on output signals from said light-receiving means; and calculating means for, when it is determined by outputs from said light-receiving means that the object is at a long distance, calculating the first signal from said light-receiving means with the information stored in said storage means to decide an object distance.

13. A distance measuring device for a camera, comprising:

light-emitting means for projecting distance measurement light to an object to be photographed;

light-receiving means for receiving a reflected signal light beam from the object, and outputting a first signal depending on an incident position of the signal light beam, and a second signal depending on an amount of reflected signal light beam;

storage means for storing information associated with a noise component which is superposed on output signals from said light-receiving means;

integrating means for integrating the output signals from said light-receiving means; and calculating means for calculating integration results from said integrating means and the information stored in said storage means to decide an object distance.

14. A distance measuring device for a camera, comprising:

light-emitting means for projecting distance measurement light to an object to be photographed;

a pair of light-receiving means for receiving a reflected signal light beam from the object, and outputting a signal depending on an incident position of the signal light beam;

storage means for storing information associated with a noise component which is superposed on output signals from said light-receiving means;

integrating means for integrating the output signal from said light-receiving means; and calculating means for calculating an integration result from said integrating means and the information stored in said storage means to decide an object distance.

15. An adjusting device for a camera having storage means capable of storing an adjusting value for a distance measuring device, comprising:

a chart arranged at a predetermined distance;

retractable light-shielding means for shielding distance measurement light from said camera;

calculating means for calculating the adjusting value of said distance measuring device on the basis of data output from the distance measuring device in distance measurement of said chart, and data output from said distance measuring device in distance measurement when the distance measurement light is shielded by said light-shielding means; and means for storing the adjusting value in said storage means of said camera.

16. An adjusting device for a camera having storage means capable of storing an adjusting value for a distance measuring device, comprising:

a first chart arranged at a predetermined distance;

a second chart having a reflectance different from said first chart;

calculating means for calculating the adjusting value of said distance measuring device on the basis of respective data output from the distance measuring device in distance measurement of said first chart and said second chart; and means for storing the adjusting value in said storage means of said camera.

* * * * *